United States Patent
Fang et al.

(10) Patent No.: US 10,075,951 B2
(45) Date of Patent: Sep. 11, 2018

(54) METHOD, BASE STATION, AND TERMINAL FOR TRANSMITTING SYSTEM INFORMATION

(71) Applicant: ZTE Corporation, Shenzhen (CN)

(72) Inventors: Huiying Fang, Shenzhen (CN); Bo Dai, Shenzhen (CN); Shuqiang Xia, Shenzhen (CN); Jing Shi, Shenzhen (CN); Xincai Li, Shenzen (CN)

(73) Assignee: ZTE Corporation, Shenzhen (CN)

( * ) Notice: Subject to any disclaimer, the term of this patent is extended or adjusted under 35 U.S.C. 154(b) by 57 days.

(21) Appl. No.: 15/024,498

(22) PCT Filed: May 19, 2014

(86) PCT No.: PCT/CN2014/077785
§ 371 (c)(1),
(2) Date: Mar. 24, 2016

(87) PCT Pub. No.: WO2014/180372
PCT Pub. Date: Nov. 13, 2014

(65) Prior Publication Data
US 2016/0234837 A1    Aug. 11, 2016

(30) Foreign Application Priority Data
Sep. 26, 2013 (CN) .......................... 2013 1 0444481

(51) Int. Cl.
*H04W 4/00* (2018.01)
*H04W 72/04* (2009.01)
*H04W 48/08* (2009.01)
*H04L 5/00* (2006.01)

(52) U.S. Cl.
CPC ....... *H04W 72/0446* (2013.01); *H04L 5/0007* (2013.01); *H04W 48/08* (2013.01)

(58) Field of Classification Search
CPC .. H04L 5/0007; H04W 48/08; H04W 72/0446
See application file for complete search history.

(56) References Cited

U.S. PATENT DOCUMENTS

2014/0302867 A1* 10/2014 Mizusawa ............. H04W 16/16
455/452.1

FOREIGN PATENT DOCUMENTS

| CN | 102365898 A | 2/2012 |
|---|---|---|
| CN | 103795505 A | 5/2014 |
| WO | 2013036021 A2 | 3/2013 |
| WO | 2013068362 A1 | 5/2013 |

OTHER PUBLICATIONS

International Search Report of EP14794018, dated Aug. 9, 2016
(Continued)

*Primary Examiner* — Kan Yuen
(74) *Attorney, Agent, or Firm* — Banner & Witcoff, Ltd.

(57) ABSTRACT

The present invention provides a method, a base station, and a terminal for transmitting system information, wherein, the method includes: determining available system information retransmission resources (201); the base station predefining that part of or all of the available system information retransmission resources are used for retransmission of system information (202).

18 Claims, 5 Drawing Sheets

(56) References Cited

OTHER PUBLICATIONS

Intel Corporation, Discussion on PBCH Coverage Enhancement for Low Cost MTC, 3GPP Draft; Aug. 10, 2013, 6 pages.
Sierra Wireless; An Analysis of Repetition and Keep Trying PBCH Decoding, 3GPP Draft, Aug. 9, 2014, 3 pages.
CATT; PBCH Coverage Improvement for Low-Cost MTC UEs, 3GPP Draft, Apr. 6, 2013, 4 pages.
Alcatel-Lucent et al; Coverage Enhancement for PBCH, 3GPP Draft, Aug. 10, 2013, 3 pages.
3rd Generation Partnership Project; Technical Specification Group Radio Access Network; Study on Provision of low-aost Machine-Type Communications, Jun. 25, 2013, 55 pages.
ZTE; Coverage Enhancement of Physical Broadcast Channel and SIB Transmission, 3GPP Draft, Sep. 28, 2013, 7 pages.
International Search Report of PCT/CN20141077785, dated Aug. 26, 2014.

* cited by examiner

METHOD, BASE STATION, AND TERMINAL FOR TRANSMITTING SYSTEM INFORMATION

TECHNICAL FIELD

The present document relates to the field of radio communications, and more particularly, to a method, a base station and a terminal for transmitting system information in a radio communication system.

BACKGROUND OF THE INVENTION

MTC (Mobile Testing Center) User Equipment (MTC UE), also known as M2M (Machine-To-Machine) user communication device, is the main application form of the Internet of things at the current stage. Low power consumption and low cost are important guarantees for its large scale applications. Smart metering devices are one of the most typical applications of the MTC device. Most smart metering MTC devices are fixedly installed in low coverage performance environments such as basement. In order to ensure that such type of MTC devices can normally communicate with the base station system, it often requires to deploy additional devices such as stations and relays, which will undoubtedly and greatly increase the deployment costs for operators. To this end, Vodafone and other companies proposed the requirements of improving the smart metering MTC device coverage under the premise of not deploying additional devices in the 3GPP (3rd Generation Partnership Project) RAN (Radio Access Network) technology proposal RP-121441.

The smart metering MTC devices are mainly used to transmit small packet data, which has low requirements for the data rate and can tolerate large data transmission delay. Since the smart metering MTC devices have very low requirements for the data rate, for a data channel, it can ensure a correct transmission of the small packet data via lower modulation and coding rate and multiple retransmissions in the time domain. But for the system frame number information that needs to be transmitted to the terminal, because currently the frame number information in the LTE system is mainly transmitted in the main system information (MIB (Management Information Base)), and the scheduling period of transmitting the MIB is 40 ms, and currently the MIB is transmitted four times in a broadcast channel in the subframe 0 of each radio frame within 40 ms, as shown in FIG. 1, respectively system information coding block 1, system information coding block 2, information system coding block 3 and system information coding block 4, and each system information coding block carries complete MIB information and can be independently decoded. The MIB messages in every 40 ms remain the same, and the system frame number (SFN) in the next MIB message will change. To improve the coverage performance of the MTC terminal and ensure that such devices can communicate properly with the base station system, it needs to increase the number of MIB transmissions in a scheduling period of 40 ms. In addition, for some traditional user terminals in the low coverage environments, it also needs to increase the number of the system information transmissions in order to ensure that the terminal device can properly communicate with the base station system.

SUMMARY OF THE INVENTION

To solve the technical problem, the present document is to provide a method, a base station and a terminal for transmitting system information, to address the transmission of cell enhanced system information with different duplex modes and subframe configurations, and ensure the normal communication needs of the terminal device under the premise of reducing the overhead of the base station system as much as possible.

To solve the abovementioned technical problem, the present document provides a method for transmitting system information, comprising:

determining available system information retransmission resources;

predefining part of or all of the available system information retransmission resources for retransmission of system information.

Preferably, the abovementioned method further has the following feature:

the available system information retransmission resources are distributed in 4 successive radio frames whose system frame numbers % M=0, 1, 2, 3, wherein, M is a scheduling interval of retransmitting the system information, M is a multiple of 4, and % M represents modulo M.

Preferably, the abovementioned method further has the following feature: subframes corresponding to the available system information retransmission resources comprise one of the following methods:

method 1:

in radio frames whose system frame numbers % M=0 and 2, the available system information retransmission resources are in at least one of subframes 0, 4 and 9;

in radio frames whose system frame numbers % M=1 and 3, the available system information retransmission resources are in at least one of subframes 0, 4, 9 and 5;

method 2:

in radio frames whose system frame numbers % M=0 and 2, the available system information retransmission resources do not comprise the subframe 5;

in radio frames whose system frame numbers % M=1 and 3, the available system information retransmission resources comprise the subframe 5;

method 3:

in radio frames whose system frame numbers % M=0, 1, 2 and 3, the available system information retransmission resources comprise the subframe 4 and/or the subframe 9;

method 4:

in radio frames whose system frame numbers % M=1 and 3, the available system information retransmission resources comprise the subframe 0 and/or the subframe 5;

in radio frames whose system frame numbers % M=0 and 2, the available system information retransmission resources comprise the subframe 0.

Preferably, the abovementioned method further has the following feature:

the subframe 0 comprises one or a half of the available system information retransmission resource; or the subframe 5 comprises two or one and a half of the available system information retransmission resources; or the subframe 4 comprises three or two or two and a half of the available system information retransmission resources; or the subframe 9 comprises three or two or two and a half of the available system information retransmission resources.

Preferably, the abovementioned method further has the following feature:

each available system information retransmission resource occupies four successive or discrete orthogonal frequency division multiplexing symbols in the same subframe in the time domain, and occupies 72 subcarriers in the frequency domain.

Preferably, the abovementioned method further has the following feature: the predefining part of or all of the available system information retransmission resources comprise at least one of the following:

if the times of retransmitting the system information is 1, the predefined system information retransmission resources in four successive radio frames whose frame numbers % M=0, 1, 2, 3 are: selecting the available system information retransmission resource in the subframe 0 of each radio frame; or, selecting one available system information retransmission resource in one subframe of each radio frame; or, selecting a half available system information retransmission resource in the subframe 0 of each radio frame and one available repeat subframe in the subframe 5 of odd-numbered radio frames;

if the times of retransmitting the system information is 2, the predefined system information retransmission resources in the four successive radio frames whose frame numbers % M=0, 1, 2, 3 are: each radio frame selecting two available system information retransmission resources in the subframe 4 or the subframe 9 according to the same method; or, each radio frame selecting two available system information retransmission resources in two different subframes according to the same method, and selecting one available system information retransmission resource in each subframe; or selecting one available system information retransmission resource in the subframe 0 and the subframe 5, and selecting one available system information retransmission resource in the subframe 4 or the subframe 9;

if the times of retransmitting the system information is 3, the predefined system information retransmission resources in the four successive radio frames whose frame numbers % M=0, 1, 2, 3 are: each radio frame selecting three available system information retransmission resources in a same subframe according to the same method; or, each radio frame selecting one available system information retransmission resource in each of three different subframes according to the same method; or, each radio frame selecting three available system information retransmission resources in two different subframes; or, selecting one available system information retransmission resource in the subframe 0 and the subframe 5, and selecting two available system information retransmission resources in the subframe 4 or the subframe 9; or, selecting one available system information retransmission resource in the subframes 0 and the subframe 5, and respectively selecting one available system information retransmission resource in the subframe 4 and the subframe 9;

if the times of retransmitting the system information is 4, the predefined system information retransmission resources in the four successive radio frames whose frame numbers % M=0, 1, 2, 3 are: each radio frame selecting one available system information retransmission resource in the subframe 0 and three available system information retransmission resources in the subframe 4 or the subframe 9 according to the same method; or, each radio frame respectively selecting two available system information retransmission resources in the subframe 4 and the subframe 9 according to the same method; or, each radio frame selecting one available system information retransmission resource in the subframe 0 and three available system information retransmission resources in the subframe 4 and the subframe 9 according to the same method; or selecting one available system information retransmission resource in the subframe 0 and the subframe 5, and selecting three available system information retransmission resources in the subframes 4 or 9; or selecting one available system information retransmission resource in the subframe 0 and the subframe 5, and selecting three available system information retransmission resources in the subframe 4 and the subframe 9;

if the times of retransmitting the system information is 5, the predefined system information retransmission resources in the four successive radio frames whose frame numbers % M=0, 1, 2, 3 are: each radio frame selecting one available system information retransmission resource in the subframe 0 and respectively two available system information retransmission resources in the subframe 4 and the subframe 9 according to the same method; or, each radio frame selecting five available system information retransmission resources in the subframe 4 and the subframe 9 according to the same method; or, each radio frame selecting one available system information retransmission resource in the subframe 0, three available system information retransmission resources in the subframes 4 and one available system information retransmission resource in the subframe 9, or one available system information retransmission resource in the subframe 4 and three available system information retransmission resources in the subframe 9 according to the same method; or selecting one available system information retransmission resource in the subframe 0 and the subframe 5, and respectively selecting two available system information retransmission resources in the subframe 4 and the subframe 9;

if the times of retransmitting the system information is 6, the predefined system information retransmission resources in the four successive radio frames whose frame numbers % M=0, 1, 2, 3 are: each radio frame respectively selecting three available system information retransmission resources in the subframe 4 and the subframe 9 according to the same method;

if the times of retransmitting the system information is 7, the predefined system information retransmission resources in the four successive radio frames whose frame numbers % M=0, 1, 2, 3 are: each radio frame selecting one available system information retransmission resource in the subframe 0 and respectively three available system information retransmission resources in the subframe 4 and the subframe 9 according to the same method;

if the times of retransmitting the system information is 8, selecting all of the available system information retransmission resources in the four successive radio frames whose frame numbers % M=0, 1, 2, 3.

Preferably, the abovementioned method further has the following feature:

the system information transmitted in the predefined available system information retransmission resources is one of the four system information coding blocks transmitted in the broadcast channel in the system information transmission period.

Preferably, the abovementioned method further has the following feature:

the coding blocks corresponding to the retransmitted system information in the predefined available system information retransmission resources in one radio frame are the same, or coding blocks are selected for the retransmission according to a predefined sequence.

To solve the abovementioned problem, the present document further provides a base station, comprising:

a determining module, configured to: determine available system information retransmission resources;

a predefining module, configured to: predefine part of or all of the available system information retransmission resources for system information retransmission.

Preferably, the abovementioned base station further has the following feature:

the determining module is configured to: determine that the available system information retransmission resources are distributed in 4 successive radio frames whose system frame numbers % M=0, 1, 2, 3, wherein, M is the scheduling interval of retransmitting the system information, M is a multiple of 4, and % M represents modulo M; wherein subframes corresponding to the available system information retransmission resources comprise one of the following methods: method 1: in radio frames whose system frame numbers % M=0 and 2, the available system information retransmission resources are in at least one of the subframes 0, 4 and 9; in radio frames whose system frame numbers % M=1 and 3, the available system information retransmission resources are in at least one of the subframes 0, 4, 9 and 5; method 2: in radio frames whose system frame numbers % M=0 and 2, the available system information retransmission resources do not comprise the subframe 5; in radio frames whose system frame numbers % M=1 and 3, the available system information retransmission resources comprise the subframe 5; method 3: in radio frames whose system frame numbers % M=0, 1, 2 and 3, the available system information retransmission resources comprise the subframe 4 and/or the subframe 9; method 4: in radio frames whose system frame numbers % M=1 and 3, the available system information retransmission resources comprise the subframe 0 and/or the subframe 5; in radio frames whose system frame numbers % M=0 and 2, the available system information retransmission resources comprise the subframe 0; the subframe 0 comprises one or a half of the available system information retransmission resource; or the subframe 5 comprises two or one and half of the available system information retransmission resources; or the subframe 4 comprises three or two or two and a half of the available system information retransmission resources; or the subframe 9 comprises three or two or two and a half of the available system information retransmission resources; each available system information retransmission resource occupies four successive or discrete orthogonal frequency division multiplexing symbols in the same subframe in the time domain, and occupies 72 subcarriers in the frequency domain.

Preferably, the abovementioned base station further has the following feature:

the predefining module is configured to: predefine part of or all of the available system information retransmission resources, comprising at least one of the following: if the times of retransmitting the system information is 1, the predefined system information retransmission resources in the four successive radio frames whose frame numbers % M=0, 1, 2, 3 are: selecting the available system information retransmission resource in the subframe 0 of each radio frame; or, selecting one available system information retransmission resource in one subframe of each radio frame; or, selecting a half of the available system information retransmission resources in the subframe 0 of each radio frame and one available repeat subframe in the subframe 5 of odd-numbered radio frames; if the times of retransmitting the system information is 2, the predefined system information retransmission resources in the four successive radio frames whose frame numbers % M=0, 1, 2, 3 are: each radio frame selecting two available system information retransmission resources in the subframe 4 or the subframe 9 according to the same method; or, each radio frame selecting two available system information retransmission resources in two different subframes according to the same method, and selecting one available system information retransmission resource in each subframe; or, selecting one available system information retransmission resource in the subframe 0 and the subframe 5, and selecting one available system information retransmission resource in the subframe 4 or the subframe 9; if the times of retransmitting the system information is 3, the predefined system information retransmission resources in the four successive radio frames whose frame numbers % M=0, 1, 2, 3 are: each radio frame selecting three available system information retransmission resources in the same subframe according to the same method; or, each radio frame selecting one available system information retransmission resource in each of three different subframes according to the same method; or, each radio frame selecting three available system information retransmission resources in two different subframes according to the same method; or, selecting one available system information retransmission resource in the subframe 0 or the subframe 5, and selecting two available system information retransmission resources in the subframe 4 or the subframe 9; or, selecting one available system information retransmission resource in the subframe 0 and the subframe 5, and respectively selecting one available system information retransmission resource in the subframe 4 and the subframe 9; if the times of retransmitting the system information is 4, the predefined system information retransmission resources in the four successive radio frames whose frame numbers % M=0, 1, 2, 3 are: each radio frame selecting one available system information retransmission resource in the subframe 0 and three available system information retransmission resources in the subframe 4 or the subframe 9 according to the same method; or, each radio frame respectively selecting two available system information retransmission resources in the subframe 4 and the subframe 9 according to the same method; or, each radio frame selecting one available system information retransmission resource in the subframe 0 and three available system information retransmission resources in the subframe 4 and the subframe 9 according to the same method; or, selecting one available system information retransmission resource in the subframe 0 and the subframe 5, and selecting three available system information retransmission resources in the subframe 4 or the subframe 9; or, selecting one available system information retransmission resource in the subframe 0 and the subframe 5, and selecting three available system information retransmission resources in the subframe 4 and the subframe 9; if the times of retransmitting the system information is 5, the predefined system information retransmission resources in the four successive radio frames whose frame numbers % M=0, 1, 2, 3 are: each radio frame selecting one available system information retransmission resource in the subframe 0 and respectively two available system information retransmission resources in the subframe 4 and the subframe 9 according to the same method; or, each radio frame selecting five available system information retransmission resources in the subframe 4 and the subframe 9 according to the same method; or, each radio frame selecting one available system information retransmission resource in the subframe 0, three in the subframes 4 and one in the subframe 9, or one in the subframes 4 and three in the subframe 9 according to the same method; or selecting one available system information retransmission resource in the subframe 0 and the subframe 5, and respectively selecting two available system information retransmission resources in the subframe 4 and the subframe 9; if the times of retransmitting the system information is 6, the predefined system information retransmission resources in the four successive radio frames whose frame numbers % M=0, 1, 2, 3 are: each radio frame respectively selecting three available system information retransmission resources in the subframe 4 and the subframe 9; if the times of retransmitting the system information is 7, the predefined system information retransmission resources in the four successive radio frames whose frame numbers % M=0, 1, 2, 3 are: each radio frame selecting one available system information retransmission resource in the subframe 0 and respectively three available system information retransmission resources in the subframe 4 and the subframe 9 according to the same method; if the times of retransmitting the system information is 8, selecting all of the available system information retransmission resources in the four successive radio frames whose frame numbers % M=0, 1, 2, 3; the system information transmitted in the predefined available system information retransmission resources is one of the four system information coding blocks transmitted in the broadcast channel in the system information transmission period; the coding blocks corresponding to the retransmitted system information in the predefined available system information retransmission resources in one radio frame are the same, or coding blocks are selected for the retransmission according to a predefined sequence.

To solve the abovementioned problem, the present document further provides a method for transmitting system information, comprising:

a terminal detecting system information, wherein the system information is system information transmitted in a broadcast channel and system information transmitted in available system information retransmission resources;

the terminal keeping trying to detect, combine and decode system information transmitted in a broadcast channel in four successive radio frames and system information transmitted in predefined system information retransmission resources, until the system information is successfully decoded.

Preferably, the abovementioned method further has the following feature:

the available system information retransmission resources are distributed in 4 successive radio frames whose system frame numbers % M=0, 1, 2, 3, wherein, M is the scheduling interval of retransmitting the system information, M is a multiple of 4, and % M represents modulo M.

Preferably, the abovementioned method further has the following feature: the subframes corresponding to the available system information retransmission resources comprise one of the following methods:

method 1:
in radio frames whose system frame numbers % M=0 and 2, the available system information retransmission resources are in at least one of the subframes 0, 4 and 9;
in radio frames whose system frame numbers % M=1 and 3, the available system information retransmission resources are in at least one of the subframes 0, 4, 9 and 5;
method 2:
in radio frames whose system frame numbers % M=0 and 2, the available system information retransmission resources do not comprise the subframe 5;
in radio frames whose system frame numbers % M=1 and 3, the available system information retransmission resources comprise the subframe 5;

method 3:
in radio frames whose system frame numbers % M=0, 1, 2 and 3, the available system information retransmission resources comprise the subframe 4 and/or the subframe 9;
method 4:
in radio frames whose system frame numbers % M=1 and 3, the available system information retransmission resources comprise the subframe 0 and/or the subframe 5;
in radio frames whose system frame numbers % M=0 and 2, the available system information retransmission resources comprise the subframe 0.

Preferably, the abovementioned method further has the following feature:

the subframe 0 comprises one or a half of the available system information retransmission resource; or the subframe 5 comprises two or one and half of the available system information retransmission resources; or the subframe 4 comprises three or two or two and a half of the available system information retransmission resources; or the subframe 9 comprises three or two or two and a half of the available system information retransmission resources.

Preferably, the abovementioned method further has the following feature:

each available system information retransmission resource occupies four successive or discrete orthogonal frequency division multiplexing symbols in the same subframe in the time domain, and occupies 72 subcarriers in the frequency domain.

Preferably, the abovementioned method further has the following feature: the predefining part of or all of the available system information retransmission resources at least comprises one of the following:

if the times of retransmitting the system information is 1, the predefined system information retransmission resources in the four successive radio frames whose frame numbers % M=0, 1, 2, 3 are: selecting the available system information retransmission resource in the subframe 0 of each radio frame; or, selecting one available system information retransmission resource in one subframe of each radio frame; or, selecting a half available system information retransmission resource in the subframe 0 of each radio frame and one available repeat subframe in the subframe 5 of odd-numbered radio frames;

if the times of retransmitting the system information is 2, the predefined system information retransmission resources in the four successive radio frames whose frame numbers % M=0, 1, 2, 3 are: each radio frame selecting two available system information retransmission resources in the subframe 4 or the subframe 9 according to the same method; or, each radio frame selecting two available system information retransmission resources in two different subframes, and selecting one available system information retransmission resource in each subframe according to the same method; or and selecting one available system information retransmission resource in the subframe 0 and the subframe 5, and selecting one available system information retransmission resource in the subframe 4 or the subframe 9;

if the times of retransmitting the system information is 3, the predefined system information retransmission resources in the four successive radio frames whose frame numbers % M=0, 1, 2, 3 are: each radio frame selecting three available system information retransmission resources in the same subframe according to the same method; or, each radio frame selecting one available system information retransmission resources in each of three different subframes according to the same method; or, each radio frame selecting three available system information retransmission resources in two different subframes according to the same method; or, selecting one available system information retransmission resource in the subframe 0 or the subframe 5, and selecting two available system information retransmission resources in the subframe 4 or the subframe 9; or, selecting one available system information retransmission resource in the subframe 0 and the subframe 5, and respectively selecting one available system information retransmission resource in the subframe 4 and the subframe 9;

if the times of retransmitting the system information is 4, the predefined system information retransmission resources in the four successive radio frames whose frame numbers % M=0, 1, 2, 3 are: each radio frame selecting one available system information retransmission resource in the subframe 0 and three available system information retransmission resources in the subframe 4 or the subframe 9 according to the same method; or, each radio frame respectively selecting two available system information retransmission resources in the subframe 4 and the subframe 9 according to the same method; or, each radio frame selecting one available system information retransmission resource in the subframe 0 and three available system information retransmission resources in the subframe 4 and the subframe 9 according to the same method; or, selecting one available system information retransmission resource in the subframe 0 and the subframe 5, and three available system information retransmission resources in the subframe 4 or subframe 9; or selecting one available system information retransmission resource in the subframe 0 and subframe 5, and selecting three available system information retransmission resources in the subframe 4 and the subframe 9;

if the times of retransmitting the system information is 5, the predefined system information retransmission resources in the four successive radio frames whose frame numbers % M=0, 1, 2, 3 are: each radio frame selecting one available system information retransmission resource in the subframe 0 and respectively two available system information retransmission resources in the subframe 4 and the subframe 9 according to the same method; or, each radio frame selecting five available system information retransmission resources in the subframe 4 and subframe 9 according to the same method; or, each radio frame selecting one available system information retransmission resource in the subframe 0, three available system information retransmission resources in the subframes 4 and one available system information retransmission resource in the subframe 9, or one available system information retransmission resource in the subframes 4 and three available system information retransmission resources in the subframe 9 according to the same method; or selecting one available system information retransmission resource in the subframe 0 and the subframe 5, and respectively selecting two available system information retransmission resources in the subframe 4 and the subframe 9;

if the times of retransmitting the system information is 6, the predefined system information retransmission resources in the four successive radio frames whose frame numbers % M=0, 1, 2, 3 are: each radio frame respectively selecting three available system information retransmission resources in the subframe 4 and the subframe 9 according to the same method;

if the times of retransmitting the system information is 7, the predefined system information retransmission resources in the four successive radio frames whose frame numbers % M=0, 1, 2, 3 are: each radio frame selecting one available system information retransmission resource in the subframe 0 and respectively three available system information retransmission resources in the subframe 4 and the subframe 9 according to the same method;

if the times of retransmitting the system information is 8, selecting all of the available system information retransmission resources in the four successive radio frames whose frame numbers % M=0, 1, 2, 3.

Preferably, the abovementioned method further has the following feature:

the system information transmitted in the predefined available system information retransmission resources is one of the four system information coding blocks transmitted in a broadcast channel in the system information transmission period.

Preferably, the abovementioned method further has the following feature:

coding blocks corresponding to the system information retransmitted in the predefined available system information retransmission resources in one radio frame are the same, or coding blocks are selected for the retransmission according to a predefined sequence.

To solve the abovementioned problem, the present document further provides a terminal, comprising:

a detecting module, configured to: a terminal detecting system information, wherein the system information is system information transmitted in a broadcast channel and system information transmitted in available system information retransmission resources;

a processing module, configured to: keep trying to detect, combine and decode system information transmitted in a broadcast channel in four successive radio frames and system information transmitted in predefined system information retransmission resources, until the system information is successfully decoded.

Preferably, the abovementioned terminal further has the following feature:

the detecting module is configured to: detect that the available system information retransmission resources are distributed in four successive radio frames whose system frame numbers % M=0, 1, 2, 3, wherein, M is the scheduling interval of retransmitting the system information, M is a multiple of 4, and % M represents the modulo M; wherein the subframes corresponding to the available system information retransmission resources comprise one of the following methods: method 1: in radio frames whose frame numbers % M=0 and 2, the available system information retransmission resources are in at least one of the subframes 0, 4 and 9; in radio frames whose system frame numbers % M=1 and 3, the available system information retransmission resources are in at least one of the subframes 0, 4, 9 and 5; method 2: in radio frames whose system frame numbers % M=0 and 2, the available system information retransmission resources do not comprise the subframe 5; in radio frames whose system frame numbers % M=1 and 3, the available system information retransmission resources comprise the subframe 5; method 3: in radio frames whose system frame numbers % M=0, 1, 2 and 3, the available system information retransmission resources comprise the subframe 4 and/or the subframe 9; method 4: in radio frames whose system frame numbers % M=1 and 3, the available system information retransmission resources comprise the subframe 0 and/or the subframe 5; in radio frames whose system frame numbers % M=0 and 2, the available system information retransmission resources comprise the subframe 0; the subframe 0 comprises one or a half of the available system information retransmission resource; or the subframe 5 comprises two or one and a half of the available system information retransmission resources; or the subframe 4 comprises three or two or two and a half of the available system information retransmission resources; or the subframe 9 comprises three or two or two and a half of the available system information retransmission resources; each of the available system information retransmission resources occupies four successive or discrete orthogonal frequency division multiplexing symbols in the same subframe in the time domain, and occupies 72 subcarriers in the frequency domain.

Preferably, the abovementioned terminal further has the following feature:

the processing module is configured to: process the predefined available system information retransmission resources, comprising at least one of the following: if the times of retransmitting the system information is 1, the predefined system information retransmission resources in the four successive radio frames whose frame numbers % M=0, 1, 2, 3 are: selecting the available system information retransmission resource in the subframe 0 of each radio frame; or, selecting one available system information retransmission resource in one subframe of each radio frame; or, selecting a half available system information retransmission resource in the subframe 0 of each radio frame and one available repeat subframe in the subframe 5 of odd-numbered radio frames; if the times of retransmitting the system information is 2, the predefined system information retransmission resources in the four successive radio frames whose frame numbers % M=0, 1, 2, 3 are: each radio frame selecting two available system information retransmission resources in the subframe 4 or the subframe 9 according to the same method; or, each radio frame selecting two available system information retransmission resources in two different subframes, and selecting one available system information retransmission resource in each subframe according to the same method; or, selecting one available system information retransmission resource in the subframe 0 and the subframe 5, and selecting one available system information retransmission resource in the subframe 4 or the subframe 9; if the times of retransmitting the system information is 3, the predefined system information retransmission resources in the four successive radio frames whose frame numbers % M=0, 1, 2, 3 are: each radio frame selecting three available system information retransmission resources in the same subframe according to the same method; or, each radio frame selecting one available system information retransmission resource in each of three different subframes according to the same method; or, each radio frame selecting three available system information retransmission resources in two different subframes according to the same method; or, selecting one available system information retransmission resource in the subframe 0 and the subframe 5, and selecting two available system information retransmission resources in the subframe 4 or the subframe 9; or, selecting one available system information retransmission resource in the subframes 0 and the subframe 5, and respectively selecting one available system information retransmission resource in the subframe 4 and the subframe 9; if the times of retransmitting the system information is 4, the predefined system information retransmission resources in the four successive radio frames whose frame numbers % M=0, 1, 2, 3 are: each radio frame selecting one available system information retransmission resource in the subframe 0 and three available system information retransmission resources in the subframe 4 or the subframe 9 according to the same method; or, each radio frame respectively selecting two available system information retransmission resources in the subframe 4 and the subframe 9 according to the same method; or, each radio frame selecting one available system information retransmission resource in the subframe 0 and three available system information retransmission resources in the subframe 4 and the subframe 9 according to the same method; or, selecting one available system information retransmission resource in the subframe 0 and the subframe 5, and three available system information retransmission resources in the subframe 4 or the subframe 9; or selecting one available system information retransmission resource in the subframe 0 and the subframe 5, and selecting three available system information retransmission resources in the subframe 4 and the subframe 9; if the times of retransmitting the system information is 5, the predefined system information retransmission resources in the four successive radio frames whose frame numbers % M=0, 1, 2, 3 are: each radio frame selecting one available system information retransmission resource in the subframe 0 and respectively two available system information retransmission resources in the subframe 4 and the subframe 9 according to the same method; or, each radio frame selecting five available system information retransmission resources in the subframe 4 and the subframe 9 according to the same method; or, each radio frame selecting one available system information retransmission resource in the subframe 0, three available system information retransmission resources in the subframes 4 and one in the subframe 9, or one in the subframe 4 and three in the subframe 9 according to the same method; or, selecting one available system information retransmission resource in the subframe 0 and the subframe 5, and respectively selecting two available system information retransmission resources in the subframe 4 and the subframe 9; if the times of retransmitting the system information is 6, the predefined system information retransmission resources in the four successive radio frames whose frame numbers % M=0, 1, 2, 3 are: each radio frame respectively selecting three available system information retransmission resources in the subframe 4 and the subframe 9 according to the same method; if the times of retransmitting the system information is 7, the predefined system information retransmission resources in the four successive radio frames whose frame numbers % M=0, 1, 2, 3 are: each radio frame selecting one available system information retransmission resource in the subframe 0 and respectively three available system information retransmission resources in the subframe 4 and the subframe 9 according to the same method; if the times of retransmitting the system information is 8, selecting all of the available system information retransmission resources in the four successive radio frames whose frame numbers % M=0, 1, 2, 3; the system information transmitted in the predefined available system information retransmission resources is one of the four system information coding blocks transmitted in the broadcast channel in the system information transmission period; the coding blocks corresponding to the system information retransmitted in the predefined available system information retransmission resources in one radio frame are the same, or the coding blocks are selected for the retransmission according to a predefined sequence.

In summary, the embodiment of the present document provides a method, a base station and a terminal for transmitting system information to ensure the consistency of system information enhanced transmission solutions in different FDD and TDD modes and in different TDD uplink and downlink configurations, and the terminal keeps trying to combine and decode the system information transmitted in the broadcast channel and the system information retransmission resources to ensure that the terminal successfully accesses the system.

PREFERRED EMBODIMENTS OF THE INVENTION

Because the low-coverage user terminal does not know the duplex configuration method and subframe configuration situation of the cell where the terminal is located upon receiving a system message, it needs to design a unified system information enhanced transmission solution for different duplex modes and subframe configurations to ensure that the user terminal correctly receives corresponding system information.

Hereinafter, in conjunction with the accompanying drawings, the embodiments of the present document will be described in detail. It should be noted that, in the case of no conflict, embodiments and features in the embodiments of the present application may be arbitrarily combined with each other.

Embodiment

The present embodiment describes and illustrates the method for transmitting system information provided in the present document for system information transmission in the FDD (Frequency Division Duplexing) and TDD (Time Division Duplexing) systems in detail.

Figure 1:
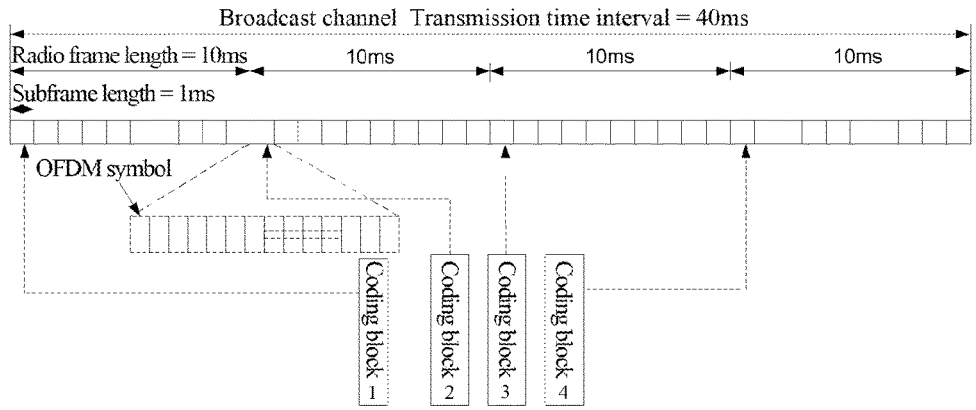
FIG. 1 is a schematic diagram of scheduling MIB messages in the related LTE system.
Figure 2:
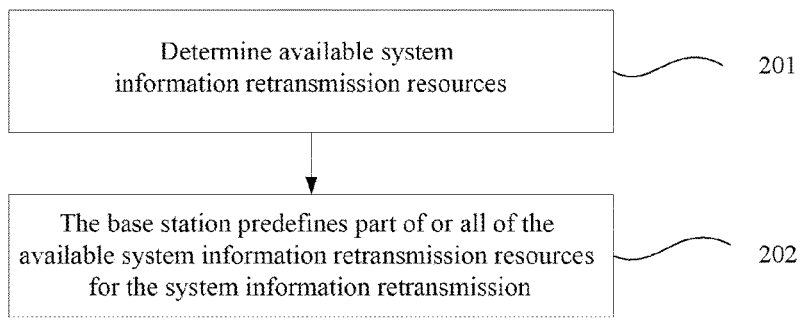
FIG. 2 is a flow chart of the processing of a method for transmitting system information at a base station side in accordance with an embodiment of the present document.
Figure 3:
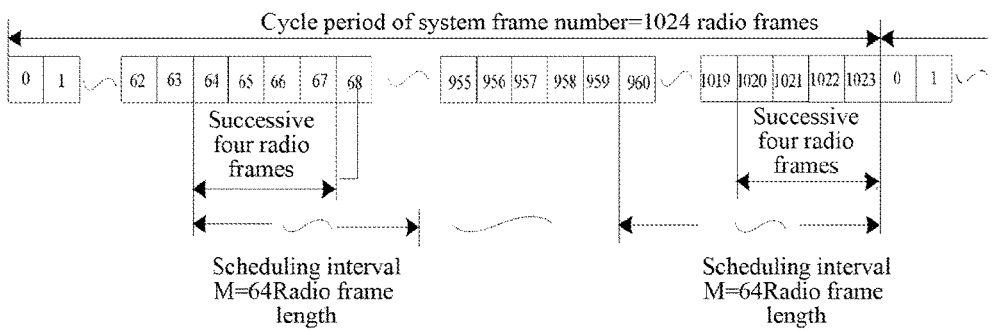
FIG. 3 is a schematic diagram of scheduling system information retransmission resources in one system frame number transmission period in accordance with an embodiment of the present document.

The specific processing steps at the base station side are shown in FIG. 2, comprising:

in step 201, the base station determines available system information retransmission resources;

as shown in FIG. 3, the available system information retransmission resources are distributed in four successive radio frames whose system frame numbers % M=0, 1, 2, 3 (corresponding to an intermittent scheduling, every M radio frames are distributed in four successive radio frames therein). M is the scheduling interval of retransmitting the system information, M is a multiple of 4, and % M represents the modulo M.

Figure 4A:
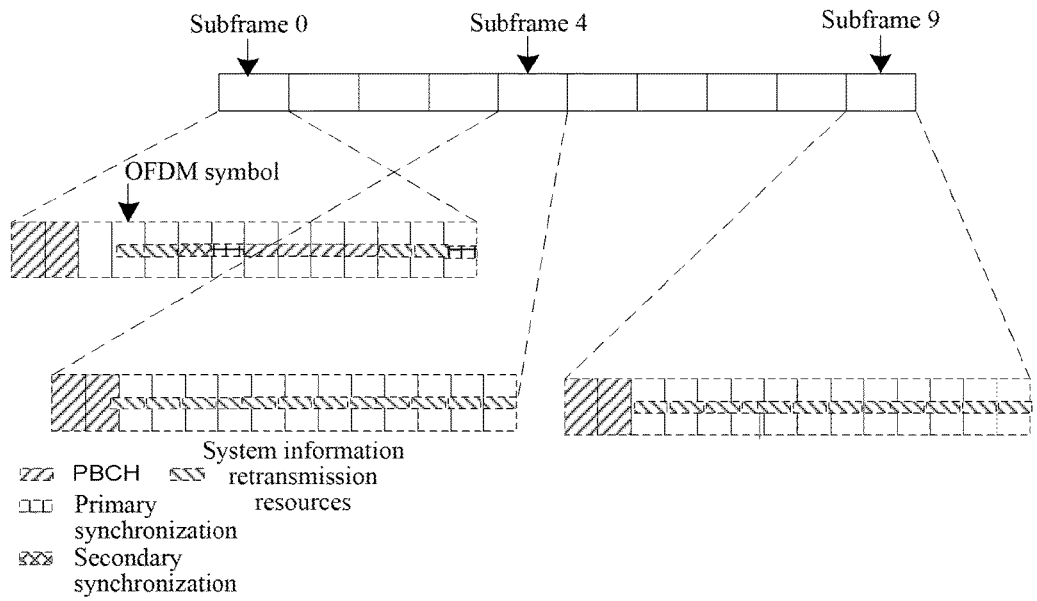
FIG. 4a to FIG. 4f are schematic diagrams of available system information retransmission resources in accordance with an embodiment of the present document.
Figure 4B:
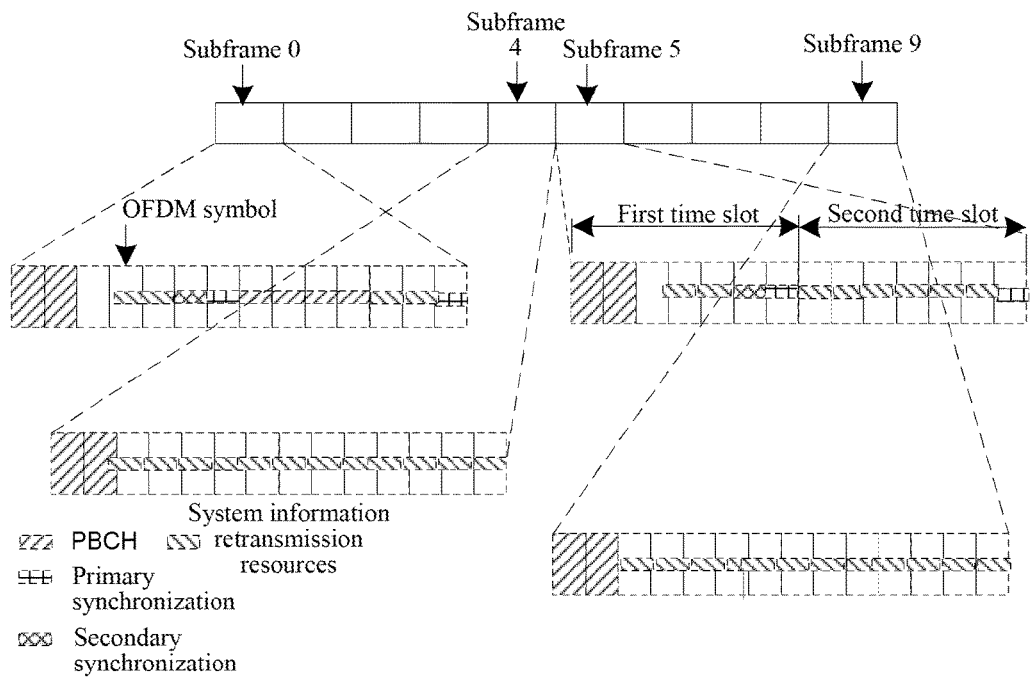
Figure 4C:
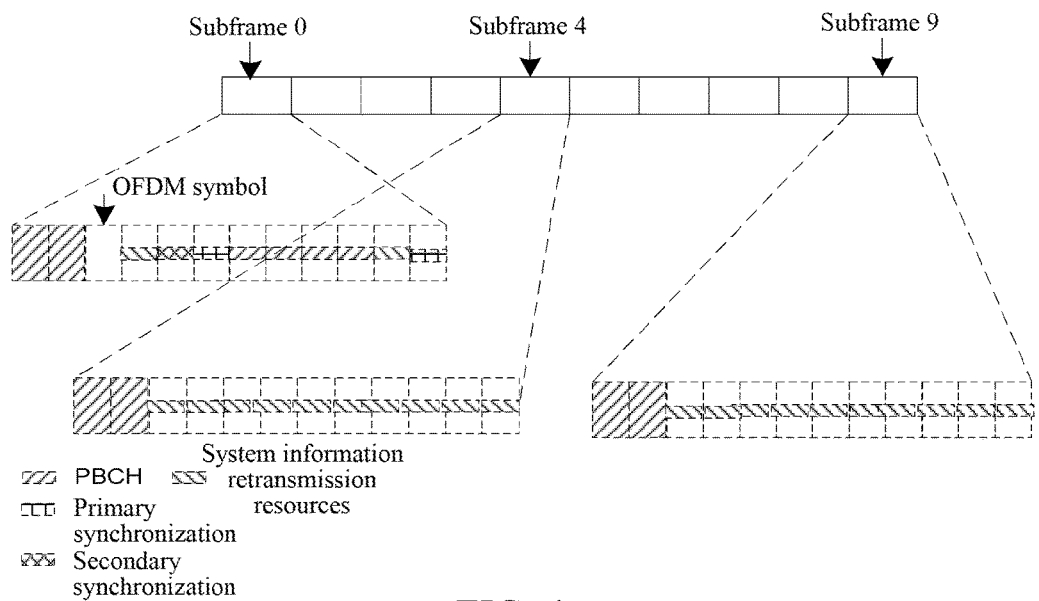
Figure 4D:
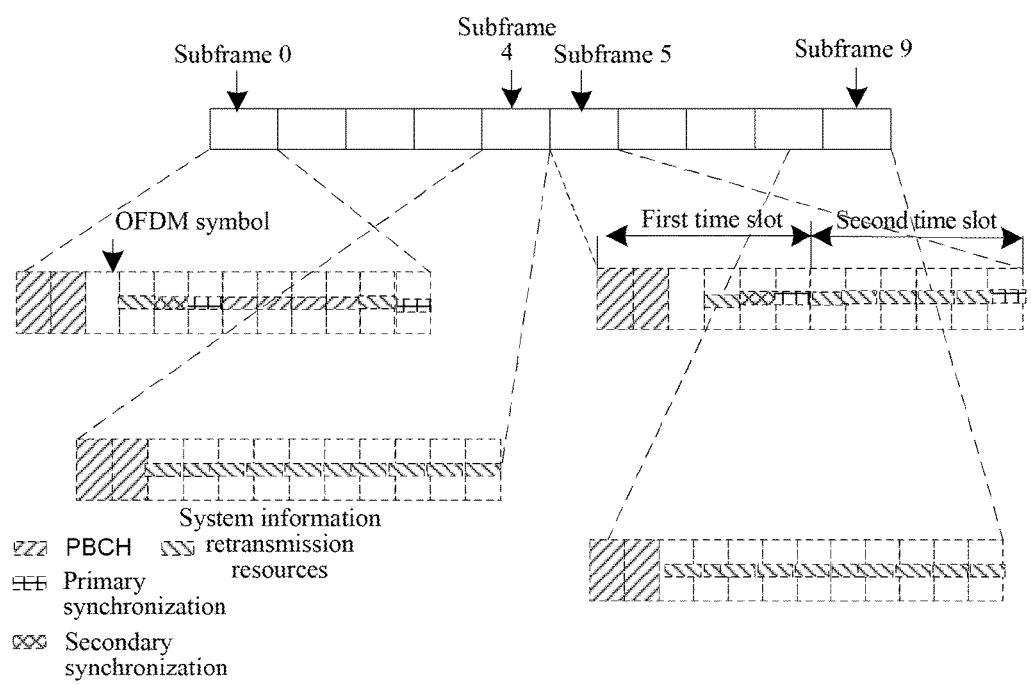
Figure 4E:
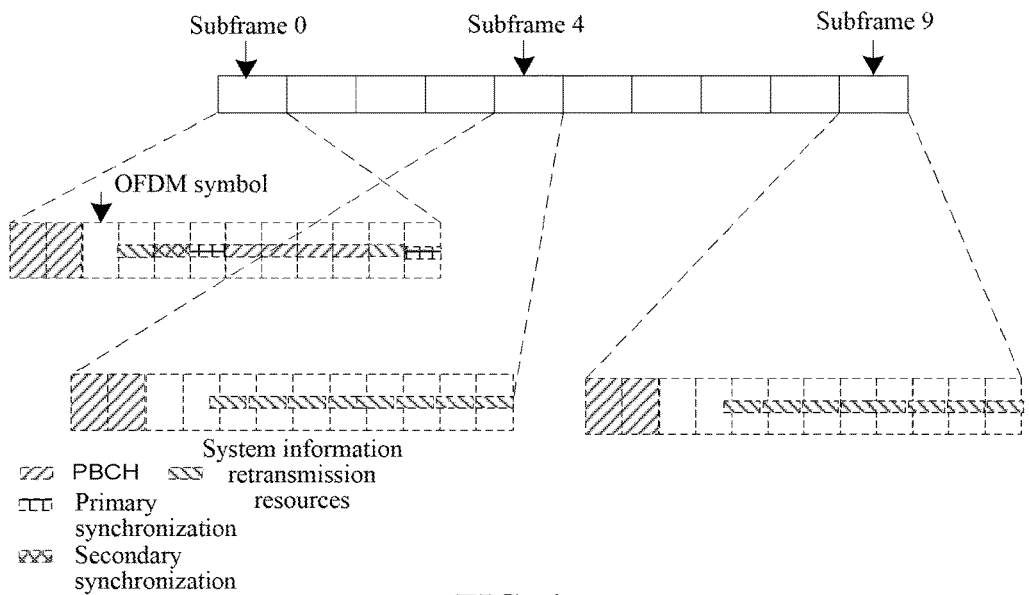
Figure 4F:
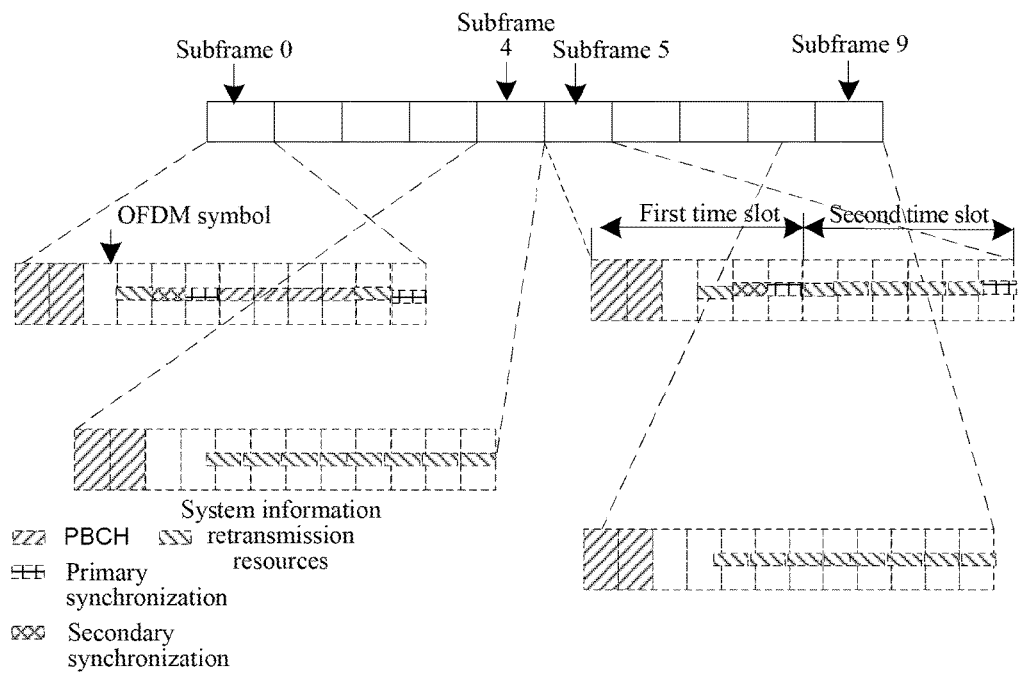

For a frame structure of the normal cyclic prefix (CP) and the extended cyclic prefix, one subframe respectively comprises 14 and 12 OFDM symbols. The subframes corresponding to the available system information retransmission resources comprise one of the following methods:

method 1: as shown in FIG. 4a and FIG. 4c, in radio frames whose system frame numbers % M=0 and 2, the available system information retransmission resources are in at least one of the subframes 0, 4 and 9; as shown in FIG. 4b and FIG. 4d, in radio frames whose system frame numbers % M=1 and 3, the available system information retransmission resources are in at least one of the subframes 0, 4, 9 and 5;

method 2: in radio frames whose system frame numbers % M=0 and 2, the available system information retransmission resources do not comprise the subframe 5; in radio frames whose system frame numbers % M=1 and 3, the available system information retransmission resources comprise the subframe 5;

method 3: in radio frames whose system frame numbers % M=0, 1, 2 and 3, the available system information retransmission resources comprise the subframe 4 and/or the subframe 9;

method 4: in radio frames whose system frame numbers % M=1 and 3, the available system information retransmission resources comprise the subframes 0 and/or the subframe 5; in radio frames whose system frame numbers % M=0 and 2, the available system information retransmission resources comprise the subframe 0 and do not comprise the subframe 5.

For the frame structure of the normal CP, as shown in FIG. 4a and FIG. 4b, the subframe 0 comprises one available system information retransmission resource; the subframe 5 comprises two available system information retransmission resources; and the subframe 4 and the subframe 9 respectively comprise three available system information retransmission resources. For the frame structure of the extended CP, as shown in FIG. 4c, FIG. 4d, FIG. 4e, and FIG. 4f, the subframe 0 comprises a half available system information retransmission resource; the subframe 5 comprises one and a half available system information retransmission resources; and the subframe 4 and the subframe 9 respectively comprise two or two and a half available system information retransmission resources. Each available system information retransmission resource occupies four successive or discrete OFDM (Orthogonal Frequency Division Multiplexing) symbols in the same subframe in the time domain, and occupies 72 subcarriers in the frequency domain.

In step 202, the base station predefines part of or all of the available system information retransmission resources for the system information retransmission.

If the times of retransmitting the system information is 1, the predefined system information retransmission resources in the four successive radio frames whose frame numbers % M=0, 1, 2, 3 are: selecting the available system information retransmission resource in the subframe 0 of each radio frame for the retransmission of system information; or, selecting one available system information retransmission resource in one subframe of each radio frame; or, selecting a half available system information retransmission resource in the subframe 0 of each radio frame and one available repeat subframe in the subframe 5 of odd-numbered radio frames.

If the times of retransmitting the system information is 2, the predefining rules in the four successive radio frames whose frame numbers % M=0, 1, 2, 3 are: each radio frame selecting two available system information retransmission resources in the same subframe (subframe 4 or subframe 9) according to the same method; or, each radio frame respectively selecting one available system information retransmission resource in two different subframes (subframe 0 or subframe 4; subframe 0 or subframe 9; subframe 4 or subframe 9) according to the same method; or, selecting one available system information retransmission resource in the subframe 0 and the subframe 5, and selecting one available system information retransmission resource in the subframe 4 or the subframe 9.

If the times of retransmitting the system information is 3, the predefining rules in the four successive radio frames whose frame numbers % M=0, 1, 2, 3 are: each radio frame selecting three available system information retransmission resources in the same subframe (subframe 4 or subframe 9) according to the same method; or, each radio frame selecting one available system information retransmission resources in each of three different subframes (subframes 0, 4 and 9) according to the same method; or, each radio frame selecting three available system information retransmission resources in two different subframes (subframe 0 or 4; subframe 0 or 9; subframe 4 or 9) according to the same method; or, selecting one available system information retransmission resource in the subframe 0 and the subframe 5, and selecting two available system information retransmission resources in the subframe 4 or the subframe 9; or, selecting one available system information retransmission resource in the subframe 0 and the subframe 5, and respectively selecting one available system information retransmission resource in the subframe 4 and the subframe 9.

If the times of retransmitting the system information is 4, the predefining rules in the four successive radio frames whose frame numbers % M=0, 1, 2, 3 are: each radio frame selecting one available system information retransmission resource in the subframe 0 and three available system information retransmission resources in the subframe 4 (or the subframe 9) according to the same method; or, each radio frame respectively selecting two available system information retransmission resources in the subframe 4 and the subframe 9 according to the same method; or, each radio frame selecting one available system information retransmission resource in the subframe 0 and three available system information retransmission resources in the subframe 4 and the subframe 9 (one in the subframe 4, two in the subframe 9; or two in the subframe 4, and one in the subframe 9) according to the same method; or, selecting one available system information retransmission resource in the subframe 0 and the subframe 5, and selecting three available system information retransmission resources in the subframe 4 or the subframe 9; or selecting one available system information retransmission resource in the subframe 0 and the subframe 5, and selecting three available system information retransmission resources in the subframe 4 and the subframe 9.

If the times of retransmitting the system information is 5, the predefining rules in the four successive radio frames whose frame numbers % M=0, 1, 2, 3 are: each radio frame selecting one available system information retransmission resource in the subframe 0 and respectively two available system information retransmission resources in the subframe 4 and the subframe 9 according to the same method; or, each radio frame selecting three available system information retransmission resources in the subframe 4 and two available system information retransmission resources in the subframe 9 (or selecting two in the subframe 4 and three in the subframe 9) according to the same method; or, each radio frame selecting one available system information retransmission resource in the subframe 0, three available system information retransmission resources in the subframes 4 and one in the subframe 9 (or selecting one in the subframe 4 and three in the subframe 9) according to the same method; or, selecting one available system information retransmission resource in the subframe 0 and the subframe 5, and respectively selecting two available system information retransmission resources in the subframe 4 and the subframe 9.

If the times of retransmitting the system information is 6, the predefining rules in the four successive radio frames whose frame numbers % M=0, 1, 2, 3 are: each radio frame respectively selecting three available system information retransmission resources in the subframe 4 and the subframe 9.

If the times of retransmitting the system information is 7, the predefining rules in the four successive radio frames whose frame numbers % M=0, 1, 2, 3 are: each radio frame selecting one available system information retransmission resource in the subframe 0 and respectively three available system information retransmission resources in the subframe 4 and the subframe 9 according to the same method.

If the times of retransmitting the system information is 8, selecting all of the available system information retransmission resources in the four successive radio frames whose frame numbers % M=0, 1, 2, 3.

the system information transmitted in the system information retransmission resources is one of the four system information coding blocks transmitted in the broadcast channel in the system information transmission period. The coding blocks corresponding to the system information retransmitted in one radio frame are the same; or coding blocks are selected for the retransmission according to a predefined sequence; such as the sequence of the coding block 1, the coding block 2, the coding block 3 and the coding block 4, or the sequence of the coding block 1, the coding block 3, the coding block 2 and the coding block 4.

Figure 5:
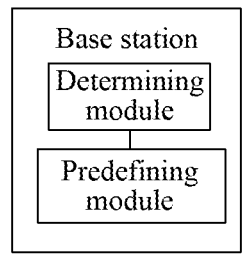
FIG. 5 is a schematic diagram of a base station in accordance with an embodiment of the present document.

The embodiment of the present document correspondingly provides a base station, as shown in FIG. 5, the base station of the present invention comprises:

a determining module, used to: determine available system information retransmission resources;

a predefining module, used to: predefine part of or all of the available system information retransmission resources for the retransmission of system information.

Figure 6:
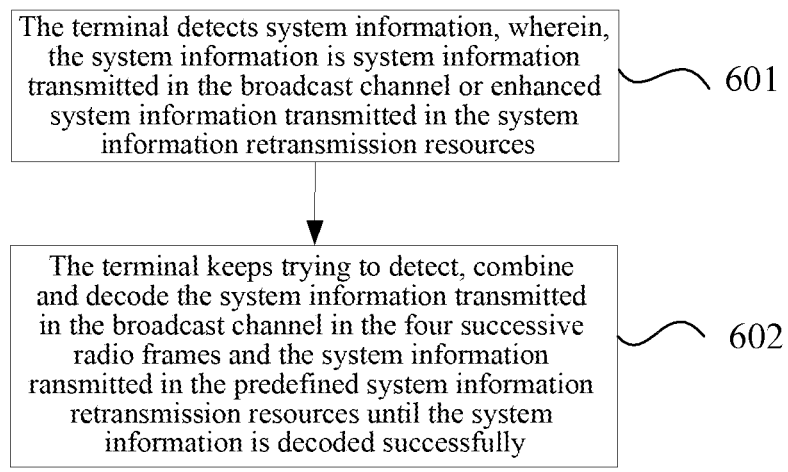
FIG. 6 is a flow chart of the processing of the method for transmitting system information at a terminal side in accordance with an embodiment of the present document.

The processing steps at the terminal side are shown in FIG. 6, comprising:

in step 601, the terminal detects system information, wherein, the system information is system information transmitted in the broadcast channel or system information transmitted in the available system information retransmission resources.

As shown in FIG. 3, the available system information retransmission resources are distributed in four successive radio frames whose system frame numbers % M=0, 1, 2, 3, wherein, M is the scheduling interval of retransmitting the system information, M is a multiple of 4, and % M represents the modulo M.

For frame structures of the normal cyclic prefix (CP) and the extended cyclic prefix, one subframe respectively comprises 14 and 12 OFDM symbols. The subframes corresponding to the available system information retransmission resources comprise one of the following methods:

method 1: as shown in FIG. 4*a* and FIG. 4*c*, in radio frames whose system frame numbers % M=0 and 2, the available system information retransmission resources are in at least one of the subframes 0, 4 and 9; as shown in FIG. 4*b* and FIG. 4*d*, in radio frames whose system frame numbers % M=1 and 3, the available system information retransmission resources are in at least one of the subframes 0, 4, 9 and 5;

method 2: in radio frames whose system frame numbers % M=0 and 2, the available system information retransmission resources do not comprise the subframe 5; in radio frames whose system frame numbers % M=1 and 3, the available system information retransmission resources comprise the subframe 5;

method 3: in radio frames whose system frame numbers % M=0, 1, 2 and 3, the available system information retransmission resources comprise the subframe 4 and/or the subframe 9;

method 4: in radio frames whose system frame numbers % M=1 and 3, the available system information retransmission resources comprise the subframe 0 and/or the subframe 5; in radio frames whose system frame numbers % M=0 and 2, the available system information retransmission resources comprise the subframe 0 and do not comprise the subframe 5.

For the frame structure of the normal CP, as shown in FIG. 4a and FIG. 4b, the subframe 0 comprises one available system information retransmission resource; the subframe 5 comprises two available system information retransmission resources; and the subframe 4 and the subframe 9 respectively comprise three available system information retransmission resources. For the frame structure of the extended CP, as shown in FIG. 4c, FIG. 4d, FIG. 4e, and FIG. 4f, the subframe 0 comprises a half available system information retransmission resource; the subframe 5 comprises one and a half available system information retransmission resources; and the subframe 4 and the subframe 9 respectively comprise two or two and a half available system information retransmission resources. Each available system information retransmission resource occupies four successive or discrete OFDM (Orthogonal Frequency Division Multiplexing) symbols in the same subframe in the time domain, and occupies 72 subcarriers in the frequency domain.

In step 602, in every four successive radio frames, the terminal keeps trying to detect, combine and decode the system information transmitted in the broadcast channel in the four successive radio frames and the system information transmitted in the predefined system information retransmission resources until the system information is decoded successfully.

If the times of retransmitting the system information is 1, the predefined system information retransmission resources in the four successive radio frames whose frame numbers % M=0, 1, 2, 3 are: selecting the available system information retransmission resource in the subframe 0 of each radio frame for the retransmission of system information; or, selecting one available system information retransmission resource in one subframe of each radio frame; or, selecting a half available system information retransmission resource in the subframe 0 of each radio frame and one available repeat subframe in the subframe 5 of odd-numbered radio frames.

If the times of retransmitting the system information is 2, the predefining rules in the four successive radio frames whose frame numbers % M=0, 1, 2, 3 are: each radio frame selecting two available system information retransmission resources in the same subframe (subframe 4 or subframe 9) according to the same method; or, each radio frame respectively selecting one available system information retransmission resource in two different subframes (subframe 0 or 4; subframe 0 or 9; subframe 4 or 9) according to the same method; or, selecting one available system information retransmission resource in the subframe 0 and the subframe 5, and selecting one available system information retransmission resource in the subframe 4 or the subframe 9.

If the times of retransmitting the system information is 3, the predefining rules in the four successive radio frames whose frame numbers % M=0, 1, 2, 3 are: each radio frame selecting three available system information retransmission resources in the same subframe (subframe 4 or subframe 9) according to the same method; or, each radio frame selecting one available system information retransmission resources in each of three different subframes (subframes 0, 4 and 9) according to the same method; or, each radio frame selecting three available system information retransmission resources in two different subframes (subframe 0 or 4; subframe 0 or 9; subframe 4 or 9) according to the same method; or, selecting one available system information retransmission resource in the subframe 0 and the subframe 5, and selecting two available system information retransmission resources in the subframe 4 or the subframe 9; or, selecting one available system information retransmission resource in the subframe 0 and the subframe 5, and respectively selecting one available system information retransmission resource in the subframe 4 and the subframe 9.

If the times of retransmitting the system information is 4, the predefining rules in the four consecutive radio frames whose frame numbers % M=0, 1, 2, 3 are: each radio frame selecting one available system information retransmission resource in the subframe 0 and three available system information retransmission resources in the subframe 4 (or subframe 9) according to the same method; or, each radio frame respectively selecting two available system information retransmission resources in the subframe 4 and the subframe 9 according to the same method; or, each radio frame selecting one available system information retransmission resource in the subframe 0 and three available system information retransmission resources in the subframe 4 and the subframe 9 (one in the subframe 4, two in the subframe 9; or two in the subframe 4, and one in the subframe 9) according to the same method; or, selecting one available system information retransmission resource in the subframe 0 and the subframe 5, and selecting three available system information retransmission resources in the subframe 4 or the subframe 9; or selecting one available system information retransmission resource in the subframe 0 and the subframe 5, and selecting three available system information retransmission resources in the subframe 4 and the subframe 9.

If the times of retransmitting the system information is 5, the predefining rules in the four successive radio frames whose frame numbers % M=0, 1, 2, 3 are: each radio frame selecting one available system information retransmission resource in the subframe 0 and respectively two available system information retransmission resources in the subframe 4 and the subframe 9 according to the same method; or, each radio frame selecting three available system information retransmission resources in the subframe 4 and two available system information retransmission resources in the subframe 9 (or two in the subframe 4, and three in the subframe 9) according to the same method; or, each radio frame selecting one available system information retransmission resource in the subframe 0, three available system information retransmission resources in the subframes 4 and one in the subframe 9 (or one in the subframe 4 and three in the subframe 9) according to the same method; or selecting one available system information retransmission resource in the subframe 0 and the subframe 5, and respectively selecting two available system information retransmission resources in the subframe 4 and the subframe 9.

If the times of retransmitting the system information is 6, the predefining rules in the four successive radio frames whose frame numbers % M=0, 1, 2, 3 are: each radio frame respectively selecting three available system information retransmission resources in the subframe 4 and the subframe 9.

If the times of retransmitting the system information is 7, the predefining rules in the four successive radio frames whose frame numbers % M=0, 1, 2, 3 are: each radio frame selecting one available system information retransmission resource in the subframe 0 and respectively three available system information retransmission resources in the subframe 4 and the subframe 9 according to the same method.

If the times of retransmitting the system information is 8, selecting all of the available system information retransmission resources in the four successive radio frames whose frame numbers % M=0, 1, 2, 3.

The system information transmitted in the system information retransmission resources is one of the four system information coding blocks transmitted in the broadcast channel in the system information transmission period. The coding blocks corresponding to the system information retransmitted in one radio frame are the same, or the coding blocks are selected for the retransmission according to a predefined sequence; such as the sequence of the coding block 1, the coding block 2, the coding block 3 and the coding block 4, or the sequence of the coding block 1, the coding block 3, the coding block 2 and the coding block 4.

Figure 7:
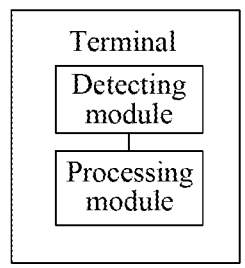
FIG. 7 is a schematic diagram of a terminal in accordance with an embodiment of the present document.

The embodiment of the present document correspondingly provides a terminal, as shown in FIG. 7, the terminal of the present embodiment comprises:

a detecting module, used by a terminal to detect system information, wherein the system information is system information transmitted in a broadcast channel and system information transmitted in available system information retransmission resources;

a processing module, used to: keep trying to detect, combine and decode system information transmitted in a broadcast channel in four successive radio frames and system information transmitted in predefined system information retransmission resources, until the system information is successfully decoded.

The present embodiment can ensure the consistency of system information enhanced transmission solutions in different FDD and TDD modes and different TDD uplink and downlink configurations, and ensure that the terminal successfully accesses the system by keeping trying to combine and decode the system information transmitted in the broadcast channel and the system information retransmission resources Those ordinarily skilled in the art can understand that all or some of steps of the abovementioned method may be completed by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

The above is only preferred embodiments of the present document, and of course, the present document may have many other embodiments, without departing from the spirit and essence of the present document, those skilled in the art can make various appropriate changes and modifications according to the present document, and these changes and modifications should belong to the protection scope of the appended claims of the present document.

INDUSTRIAL APPLICABILITY

The embodiment of the present document provides a method, a base station and a terminal for transmitting system information to ensure the consistency of system information enhanced transmission solutions in different FDD and TDD modes and different TDD uplink and downlink configurations, and the terminal keeps trying to combine and decode the system information transmitted in the broadcast channel and the system information retransmission resources in order to ensure that the terminal successfully accesses the system.

What is claimed is:

1. A method for transmitting system information, comprising:
    determining available system information retransmission resources;
    predefining part of or all of the available system information retransmission resources for retransmission of system information;
    retransmitting the system information based on available system information retransmission resources to improve coverage performance,
    wherein,
    the available system information retransmission resources are distributed in 4 successive radio frames whose system frame numbers % M=0, 1, 2, 3, wherein, M is a scheduling interval of retransmitting the system information, M is a multiple of 4 and % M represents modulo M.

2. The method of claim 1, wherein, subframes corresponding to the available system information retransmission resources comprise one of the following methods:
    method 1:
    in radio frames whose system frame numbers % M=0 and 2, the available system information retransmission resources are in at least one of subframes 0, 4 and 9;
    in radio frames whose system frame numbers % M=1 and 3, the available system information retransmission resources are in at least one of subframes 0, 4, 9 and 5;
    method 2:
    in radio frames whose system frame numbers % M=0 and 2, the available system information retransmission resources do not comprise the subframe 5;
    in radio frames whose system frame numbers % M=1 and 3, the available system information retransmission resources comprise the subframe 5;
    method 3:
    in radio frames whose system frame numbers % M=0, 1, 2 and 3, the available system information retransmission resources comprise the subframe 4 and/or the subframe 9;
    method 4:
    in radio frames whose system frame numbers % M=1 and 3, the available system information retransmission resources comprise the subframe 0 and/or the subframe 5;
    in radio frames whose system frame numbers % M=0 and 2, the available system information retransmission resources comprise the subframe 0.

3. The method of claim 2, wherein,
the subframe 0 comprises one or a half of the available system information retransmission resource; or
the subframe 5 comprises two or one and a half of the available system information retransmission resources; or
the subframe 4 comprises three or two or two and a half of the available system information retransmission resources; or
the subframe 9 comprises three or two or two and a half of the available system information retransmission resources.

4. The method of claim 1, wherein,
each available system information retransmission resource occupies four successive or discrete orthogonal frequency division multiplexing symbols in the same subframe in a time domain and occupies 72 subcarriers in a frequency domain.

5. The method of claim 1, wherein, the predefining part of or all of the available system information retransmission resources comprise at least one of the following:
if the times of retransmitting the system information is 1, predefined system information retransmission resources in four successive radio frames whose frame numbers % M=0, 1, 2, 3 are: selecting an available system information retransmission resource in the subframe 0 of each radio frame; or, selecting one available system information retransmission resource in one subframe of each radio frame; or, selecting a half available system information retransmission resource in the subframe 0 of each radio frame and one available repeat subframe in the subframe 5 of odd-numbered radio frames;
if the times of retransmitting the system information is 2, the predefined system information retransmission resources in the four successive radio frames whose frame numbers % M=0, 1, 2, 3 are: each radio frame selecting two available system information retransmission resources in the subframe 4 or the subframe 9 according to the same method; or, each radio frame selecting two available system information retransmission resources in two different subframes according to the same method, and selecting one available system information retransmission resource in each subframe; or selecting one available system information retransmission resource in the subframe 0 and the subframe 5, and selecting one available system information retransmission resource in the subframe 4 or the subframe 9;
if the times of retransmitting the system information is 3, the predefined system information retransmission resources in the four successive radio frames whose frame numbers % M=0, 1, 2, 3 are: each radio frame selecting three available system information retransmission resources in a same subframe according to the same method; or, each radio frame selecting one available system information retransmission resource in each of three different subframes according to the same method; or, each radio frame selecting three available system information retransmission resources in two different subframes according to the same method; or, selecting one available system information retransmission resource in the subframe 0 and the subframe 5, and selecting two available system information retransmission resources in the subframe 4 or the subframe 9; or, selecting one available system information retransmission resource in the subframes 0 and the subframe 5, and respectively selecting one available system information retransmission resource in the subframe 4 and the subframe 9;
if the times of retransmitting the system information is 4, the predefined system information retransmission resources in the four successive radio frames whose frame numbers % M=0, 1, 2, 3 are: each radio frame selecting one available system information retransmission resource in the subframe 0 and three available system information retransmission resources in the subframe 4 or the subframe 9 according to the same method; or, each radio frame respectively selecting two available system information retransmission resources in the subframe 4 and the subframe 9 according to the same method; or, each radio frame selecting one available system information retransmission resource in the subframe 0 and three available system information retransmission resources in the subframe 4 and the subframe 9 according to the same method; or selecting one available system information retransmission resource in the subframe 0 and the subframe 5, and selecting three available system information retransmission resources in the subframe 4 or subframe 9; or selecting one available system information retransmission resource in the subframe 0 and the subframe 5, and selecting three available system information retransmission resources in the subframe 4 and the subframe 9;
if the times of retransmitting the system information is 5, the predefined system information retransmission resources in the four successive radio frames whose frame numbers % M=0, 1, 2, 3 are: each radio frame selecting one available system information retransmission resource in the subframe 0 and respectively two available system information retransmission resources in the subframe 4 and the subframe 9 according to the same method; or, each radio frame selecting five available system information retransmission resources in the subframe 4 and the subframe 9 according to the same method; or, each radio frame selecting one available system information retransmission resource in the subframe 0, three available system information retransmission resources in the subframes 4 and one available system information retransmission resource in the subframe 9, or one available system information retransmission resource in the subframe 4 and three available system information retransmission resources in the subframe 9 according to the same method; or selecting one available system information retransmission resource in the subframe 0 and the subframe 5, and respectively selecting two available system information retransmission resources in the subframe 4 and the subframe 9;
if the times of retransmitting the system information is 6, the predefined system information retransmission resources in the four successive radio frames whose frame numbers % M=0, 1, 2, 3 are: each radio frame respectively selecting three available system information retransmission resources in the subframe 4 and the subframe 9 according to the same method;
if the times of retransmitting the system information is 7, the predefined system information retransmission resources in the four successive radio frames whose frame numbers % M=0, 1, 2, 3 are: each radio frame selecting one available system information retransmission resource in the subframe 0 and respectively three available system information retransmission resources in the subframe 4 and the subframe 9 according to the same method;

if the times of retransmitting the system information is 8, selecting all of the available system information retransmission resources in the four successive radio frames whose frame numbers % M=0, 1, 2, 3.

6. The method of claim 1, wherein, system information transmitted in the predefined available system information retransmission resources is one of four system information coding blocks transmitted in a broadcast channel in a system information transmission period;

or coding blocks corresponding to system information retransmitted in predefined available system information retransmission resources in one radio frame are the same, or coding blocks are selected for retransmission according to a predefined sequence.

7. The method of claim 1, further comprising:

detecting system information by a terminal, wherein the system information is system information transmitted in a broadcast channel and system information transmitted in available system information retransmission resources;

detecting, combining and decoding system information, by the terminal, transmitted in a broadcast channel in four successive radio frames and system information transmitted in predefined system information retransmission resources, until the system information is successfully decoded.

8. The method of claim 7, wherein, subframes corresponding to the available system information retransmission resources comprise one of the following methods:

method 1:
in radio frames whose system frame numbers % M=0 and 2, the available system information retransmission resources are in at least one of the subframes 0, 4 and 9;
in radio frames whose system frame numbers % M=1 and 3, the available system information retransmission resources are in at least one of the subframes 0, 4, 9 and 5;

method 2:
in radio frames whose system frame numbers % M=0 and 2, the available system information retransmission resources do not comprise the subframe 5;
in radio frames whose system frame numbers % M=1 and 3, the available system information retransmission resources comprise the subframe 5;

method 3:
in radio frames whose system frame numbers % M=0, 1, 2 and 3, the available system information retransmission resources comprise the subframe 4 and/or the subframe 9;

method 4:
in radio frames whose system frame numbers % M=1 and 3, the available system information retransmission resources comprise the subframe 0 and/or the subframe 5;
in radio frames whose system frame numbers % M=0 and 2, the available system information retransmission resources comprise the subframe 0.

9. The method of claim 8, wherein, the subframe 0 comprises one or a half of the available system information retransmission resource; or the subframe 5 comprises two or one and half of the available system information retransmission resources; or the subframe 4 comprises three or two or two and a half of the available system information retransmission resources; or the subframe 9 comprises three or two or two and a half of the available system information retransmission resources.

10. The method of claim 7, wherein, each available system information retransmission resource occupies four successive or discrete orthogonal frequency division multiplexing symbols in the same subframe in a time domain and occupies 72 subcarriers in a frequency domain.

11. The method of claim 7, wherein, the predefining part of or all of the available system information retransmission resources at least comprises one of the following:

if the times of retransmitting the system information is 1, predefined system information retransmission resources in the four successive radio frames whose frame numbers % M=0, 1, 2, 3 are: selecting an available system information retransmission resource in the subframe 0 of each radio frame; or, selecting one available system information retransmission resource in one subframe of each radio frame; or, selecting a half available system information retransmission resource in the subframe 0 of each radio frame and one available repeat subframe in the subframe 5 of odd-numbered radio frames;

if the times of retransmitting the system information is 2, the predefined system information retransmission resources in the four successive radio frames whose frame numbers % M=0, 1, 2, 3 are: each radio frame selecting two available system information retransmission resources in the subframe 4 or the subframe 9 according to the same method; or, each radio frame selecting two available system information retransmission resources in two different subframes, and selecting one available system information retransmission resource in each subframe according to the same method; or and selecting one available system information retransmission resource in the subframe 0 and the subframe 5, and selecting one available system information retransmission resource in the subframe 4 or the subframe 9;

if the times of retransmitting the system information is 3, the predefined system information retransmission resources in the four successive radio frames whose frame numbers % M=0, 1, 2, 3 are: each radio frame selecting three available system information retransmission resources in the same subframe according to the same method; or, each radio frame selecting one available system information retransmission resources in each of three different subframes according to the same method; or, each radio frame selecting three available system information retransmission resources in two different subframes according to the same method; or, selecting one available system information retransmission resource in the subframe 0 and the subframe 5, and selecting two available system information retransmission resources in the subframe 4 or the subframe 9; or, selecting one available system information retransmission resource in the subframe 0 and the subframe 5, and respectively selecting one available system information retransmission resource in the subframe 4 and the subframe 9;

if the times of retransmitting the system information is 4, the predefined system information retransmission resources in the four successive radio frames whose frame numbers % M=0, 1, 2, 3 are: each radio frame selecting one available system information retransmission resource in the subframe 0 and three available system information retransmission resources in the subframe 4 or the subframe 9 according to the same method; or, each radio frame respectively selecting two available system information retransmission resources in the subframe 4 and the subframe 9 according to the same method; or, each radio frame selecting one available system information retransmission resource in the subframe 0 and three available system information retransmission resources in the subframe 4 and the subframe 9 according to the same method; or, selecting one available system information retransmission resource in the subframe 0 and the subframe 5, and three available system information retransmission resources in the subframe 4 or subframe 9; or selecting one available system information retransmission resource in the subframe 0 and subframe 5, and selecting three available system information retransmission resources in the subframe 4 and the subframe 9;

if the times of retransmitting the system information is 5, the predefined system information retransmission resources in the four successive radio frames whose frame numbers % M=0, 1, 2, 3 are: each radio frame selecting one available system information retransmission resource in the subframe 0 and respectively two available system information retransmission resources in the subframe 4 and the subframe 9 according to the same method; or, each radio frame selecting five available system information retransmission resources in the subframe 4 and subframe 9 according to the same method; or, each radio frame selecting one available system information retransmission resource in the subframe 0, three available system information retransmission resources in the subframes 4 and one available system information retransmission resource in the subframe 9, or one available system information retransmission resource in the subframes 4 and three available system information retransmission resources in the subframe 9 according to the same method; or selecting one available system information retransmission resource in the subframe 0 and the subframe 5, and respectively selecting two available system information retransmission resources in the subframe 4 and the subframe 9;

if the times of retransmitting the system information is 6, the predefined system information retransmission resources in the four successive radio frames whose frame numbers % M=0, 1, 2, 3 are: each radio frame respectively selecting three available system information retransmission resources in the subframe 4 and the subframe 9 according to the same method;

if the times of retransmitting the system information is 7, the predefined system information retransmission resources in the four successive radio frames whose frame numbers % M=0, 1, 2, 3 are: each radio frame selecting one available system information retransmission resource in the subframe 0 and respectively three available system information retransmission resources in the subframe 4 and the subframe 9 according to the same method;

if the times of retransmitting the system information is 8, selecting all of the available system information retransmission resources in the four successive radio frames whose frame numbers % M=0, 1, 2, 3.

12. The method of claim 7, wherein,
system information transmitted in the predefined available system information retransmission resources is one of four system information coding blocks transmitted in a broadcast channel in the system information transmission period;
or
coding blocks corresponding to system information retransmitted in predefined available system information retransmission resources in one radio frame are the same, or coding blocks are selected for retransmission according to a predefined sequence.

13. A base station, comprising hardware performing instructions stored in a non-transitory computer readable medium which executes steps in the following modules:
a determining module, configured to: determine available system information retransmission resources;
a predefining module, configured to: predefine part of or all of the available system information retransmission resources for retransmission of system information,
wherein the base station is configured to retransmit the system information based on available system information retransmission resources to improve coverage performance,
wherein,
the available system information retransmission resources are distributed in 4 successive radio frames whose system frame numbers % M=0, 1, 2, 3, wherein, M is a scheduling interval of retransmitting the system information, M is a multiple of 4 and % M represents modulo M.

14. The base station of claim 13, wherein,
the determining module is configured to: determine that the available system information retransmission resources are distributed in 4 successive radio frames whose system frame numbers % M=0, 1, 2, 3, wherein, M is a scheduling interval of retransmitting the system information, M is a multiple of 4 and % M represents modulo M; wherein subframes corresponding to the available system information retransmission resources comprise one of the following methods: method 1: in radio frames whose system frame numbers % M=0 and 2, the available system information retransmission resources are in at least one of subframes 0, 4 and 9; in radio frames whose system frame numbers % M=1 and 3, the available system information retransmission resources are in at least one of subframes 0, 4, 9 and 5; method 2: in radio frames whose system frame numbers % M=0 and 2, the available system information retransmission resources do not comprise the subframe 5; in radio frames whose system frame numbers % M=1 and 3, the available system information retransmission resources comprise the subframe 5; method 3: in radio frames whose system frame numbers % M=0, 1, 2 and 3, the available system information retransmission resources comprise the subframe 4 and/or the subframe 9; method 4: in radio frames whose system frame numbers % M=1 and 3, the available system information retransmission resources comprise the subframe 0 and/or the subframe 5; in radio frames whose system frame numbers % M=0 and 2, the available system information retransmission resources comprise the subframe 0; the subframe 0 comprises one or a half of the available system information retransmission resource; or the subframe 5 comprises two or one and half of the available system information retransmission resources; or the subframe 4 comprises three or two or two and a half of the available system information retransmission resources; or the subframe 9 comprises three or two or two and a half of the available system information retransmission resources; each available system information retransmission resource occupies four successive or discrete orthogonal frequency division multiplexing symbols in the same subframe in a time domain and occupies 72 subcarriers in a frequency domain.

15. The base station of claim 13, wherein,
the predefining module is configured to: predefine part of or all of the available system information retransmission resources, comprising at least one of the following: if the times of retransmitting the system information is 1, the predefined system information retransmission resources in the four successive radio frames whose frame numbers % M=0, 1, 2, 3 are: selecting an available system information retransmission resource in a subframe 0 of each radio frame; or, selecting one available system information retransmission resource in one subframe of each radio frame; or, selecting a half of the available system information retransmission resources in a subframe 0 of each radio frame and one available repeat subframe in a subframe 5 of odd-numbered radio frames; if the times of retransmitting the system information is 2, the predefined system information retransmission resources in the four successive radio frames whose frame numbers % M=0, 1, 2, 3 are: each radio frame selecting two available system information retransmission resources in a subframe 4 or a subframe 9 according to the same method; or, each radio frame selecting two available system information retransmission resources in two different subframes according to the same method, and selecting one available system information retransmission resource in each subframe; or, selecting one available system information retransmission resource in the subframe 0 and the subframe 5, and selecting one available system information retransmission resource in the subframe 4 or the subframe 9; if the times of retransmitting the system information is 3, the predefined system information retransmission resources in the four successive radio frames whose frame numbers % M=0, 1, 2, 3 are: each radio frame selecting three available system information retransmission resources in the same subframe according to the same method; or, each radio frame selecting one available system information retransmission resource in each of three different subframes according to the same method; or, each radio frame selecting three available system information retransmission resources in two different subframes according to the same method; or, selecting one available system information retransmission resource in the subframe 0 and the subframe 5, and selecting two available system information retransmission resources in the subframe 4 or the subframe 9; or, selecting one available system information retransmission resource in the subframe 0 and the subframe 5, and respectively selecting one available system information retransmission resource in the subframe 4 and the subframe 9; if the times of retransmitting the system information is 4, the predefined system information retransmission resources in the four successive radio frames whose frame numbers % M=0, 1, 2, 3 are: each radio frame selecting one available system information retransmission resource in the subframe 0 and three available system information retransmission resources in the subframe 4 or the subframe 9 according to the same method; or, each radio frame respectively selecting two available system information retransmission resources in the subframe 4 and the subframe 9 according to the same method; or, each radio frame selecting one available system information retransmission resource in the subframe 0 and three available system information retransmission resources in the subframe 4 and the subframe 9 according to the same method; or, selecting one available system information retransmission resource in the subframe 0 and the subframe 5, and selecting three available system information retransmission resources in the subframe 4 or the subframe 9; or, selecting one available system information retransmission resource in the subframe 0 and the subframe 5, and selecting three available system information retransmission resources in the subframe 4 and the subframe 9; if the times of retransmitting the system information is 5, the predefined system information retransmission resources in the four successive radio frames whose frame numbers % M=0, 1, 2, 3 are: each radio frame selecting one available system information retransmission resource in the subframe 0 and respectively two available system information retransmission resources in the subframe 4 and the subframe 9 according to the same method; or, each radio frame selecting five available system information retransmission resources in the subframe 4 and the subframe 9 according to the same method; or, each radio frame selecting one available system information retransmission resource in the subframe 0, three in the subframes 4 and one in the subframe 9, or one in the subframes 4 and three in the subframe 9 according to the same method; or selecting one available system information retransmission resource in the subframe 0 and the subframe 5, and respectively selecting two available system information retransmission resources in the subframe 4 and the subframe 9; if the times of retransmitting the system information is 6, the predefined system information retransmission resources in the four successive radio frames whose frame numbers % M=0, 1, 2, 3 are: each radio frame respectively selecting three available system information retransmission resources in the subframe 4 and the subframe 9; if the times of retransmitting the system information is 7, the predefined system information retransmission resources in the four successive radio frames whose frame numbers % M=0, 1, 2, 3 are: each radio frame selecting one available system information retransmission resource in the subframe 0 and respectively three available system information retransmission resources in the subframe 4 and the subframe 9; if the times of retransmitting the system information is 8, selecting all of the available system information retransmission resources in the four successive radio frames whose frame numbers % M=0, 1, 2, 3; system information transmitted in predefined available system information retransmission resources is one of four system information coding blocks transmitted in a broadcast channel in a system information transmission period; coding blocks corresponding to system information retransmitted in the predefined available system information retransmission resources in one radio frame are the same, or coding blocks are selected for retransmission according to a predefined sequence.

16. A system for transmitting system information, comprising a base station as defined in claim 13 and a terminal, the terminal comprising hardware performing instructions stored in a non-transitory computer readable medium which executes steps in the following modules:
 a detecting module, configured to: a terminal detecting system information, wherein the system information is system information transmitted in a broadcast channel and system information transmitted in available system information retransmission resources;
 a processing module, configured to: detect, combine and decode system information transmitted in a broadcast channel in four successive radio frames and system information transmitted in predefined system information retransmission resources, until the system information is successfully decoded.

17. The system of claim 16, wherein,
 the detecting module is configured to: detect that the available system information retransmission resources are distributed in four successive radio frames whose system frame numbers % M=0, 1, 2, 3, wherein, M is a scheduling interval of retransmitting the system information, M is a multiple of 4 and % M represents modulo M; wherein subframes corresponding to the available system information retransmission resources comprise one of the following methods: method 1: in radio frames whose system frame numbers % M=0 and 2, the available system information retransmission resources are in at least one of the subframes 0, 4 and 9; in radio frames whose system frame numbers % M=1 and 3, the available system information retransmission resources are in at least one of the subframes 0, 4, 9 and 5; method 2: in radio frames whose system frame numbers % M=0 and 2, the available system information retransmission resources do not comprise the subframe 5; in radio frames whose system frame numbers % M=1 and 3, the available system information retransmission resources comprise the subframe 5; method 3: in radio frames whose system frame numbers % M=0, 1, 2 and 3, the available system information retransmission resources comprise the subframe 4 and/or the subframe 9; method 4: in radio frames whose system frame numbers % M=1 and 3, the available system information retransmission resources comprise the subframe 0 and/or the subframe 5; in radio frames whose system frame numbers % M=0 and 2, the available system information retransmission resources comprise the subframe 0; the subframe 0 comprises one or a half of the available system information retransmission resource; or the subframe 5 comprises two or one and a half of the available system information retransmission resources; or the subframe 4 comprises three or two or two and a half of the available system information retransmission resources; or the subframe 9 comprises three or two or two and a half of the available system information retransmission resources; each of the available system information retransmission resources occupies four successive or discrete orthogonal frequency division multiplexing symbols in the same subframe in a time domain and occupies 72 subcarriers in a frequency domain.

18. The system of claim 16, wherein,
 the processing module is configured to: process the predefined available system information retransmission resources, comprising at least one of the following: if the times of retransmitting the system information is 1, the predefined system information retransmission resources in the four successive radio frames whose frame numbers % M=0, 1, 2, 3 are: selecting an available system information retransmission resource in a subframe 0 of each radio frame; or, selecting one available system information retransmission resource in one subframe of each radio frame; or, selecting a half available system information retransmission resource in the subframe 0 of each radio frame and one available repeat subframe in a subframe 5 of odd-numbered radio frames; if the times of retransmitting the system information is 2, the predefined system information retransmission resources in the four successive radio frames whose frame numbers % M=0, 1, 2, 3 are: each radio frame selecting two available system information retransmission resources in a subframe 4 or a subframe 9 according to the same method; or, each radio frame selecting two available system information retransmission resources in two different subframes, and selecting one available system information retransmission resource in each subframe according to the same method; or, selecting one available system information retransmission resource in the subframe 0 and the subframe 5, and selecting one available system information retransmission resource in the subframe 4 or the subframe 9; if the times of retransmitting the system information is 3, the predefined system information retransmission resources in the four successive radio frames whose frame numbers % M=0, 1, 2, 3 are: each radio frame selecting three available system information retransmission resources in the same subframe according to the same method; or, each radio frame selecting one available system information retransmission resource in each of three different subframes according to the same method; or, each radio frame selecting three available system information retransmission resources in two different subframes according to the same method; or, selecting one available system information retransmission resource in the subframe 0 and the subframe 5, and selecting two available system information retransmission resources in the subframe 4 or the subframe 9; or, selecting one available system information retransmission resource in the subframes 0 and the subframe 5, and respectively selecting one available system information retransmission resource in the subframe 4 and the subframe 9; if the times of retransmitting the system information is 4, the predefined system information retransmission resources in the four successive radio frames whose frame numbers % M=0, 1, 2, 3 are: each radio frame selecting one available system information retransmission resource in the subframe 0 and three available system information retransmission resources in the subframe 4 or the subframe 9 according to the same method; or, each radio frame respectively selecting two available system information retransmission resources in the subframe 4 and the subframe 9 according to the same method; or, each radio frame selecting one available system information retransmission resource in the subframe 0 and three available system information retransmission resources in the subframe 4 and the subframe 9 according to the same method; or, selecting one available system information retransmission resource in the subframe 0 and the subframe 5, and three available system information retransmission resources in the subframe 4 or the subframe 9; or selecting one available system information retransmission resource in the subframe 0 and the subframe 5, and selecting three available system information retransmission resources in the subframe 4 and the subframe 9; if the times of retransmitting the system information is 5, the predefined system information retransmission resources in the four successive radio frames whose frame numbers % M=0, 1, 2, 3 are: each radio frame selecting one available system information retransmission resource in the subframe 0 and respectively two available system information retransmission resources in the subframe 4 and the subframe 9 according to the same method; or, each radio frame selecting five available system information retransmission resources in the subframe 4 and the subframe 9 according to the same method; or, each radio frame selecting one available system information retransmission resource in the subframe 0, three available system information retransmission resources in the subframes 4 and one in the subframe 9, or one in the subframe 4 and three in the subframe 9 according to the same method; or, selecting one available system information retransmission resource in the subframe 0 and the subframe 5, and respectively selecting two available system information retransmission resources in the subframe 4 and the subframe 9; if the times of retransmitting the system information is 6, the predefined system information retransmission resources in the four successive radio frames whose frame numbers % M=0, 1, 2, 3 are: each radio frame respectively selecting three available system information retransmission resources in the subframe 4 and the subframe 9 according to the same method; if the times of retransmitting the system information is 7, the predefined system information retransmission resources in the four successive radio frames whose frame numbers % M=0, 1, 2, 3 are: each radio frame selecting one available system information retransmission resource in the subframe 0 and respectively three available system information retransmission resources in the subframe 4 and the subframe 9 according to the same method; if the times of retransmitting the system information is 8, selecting all of the available system information retransmission resources in the four successive radio frames whose frame numbers % M=0, 1, 2, 3; system information transmitted in the predefined available system information retransmission resources is one of four system information coding blocks transmitted in a broadcast channel in a system information transmission period; coding blocks corresponding to system information retransmitted in the predefined available system information retransmission resources in one radio frame are the same, or coding blocks are selected for retransmission according to a predefined sequence.

* * * * *